United States Patent [19]
Nielsen

[11] 3,764,055
[45] Oct. 9, 1973

[54] WIRE BONDER
[75] Inventor: Jorgen F. Nielsen, Danvers, Mass.
[73] Assignee: GTI Corporation, Pittsburgh, Pa.
[22] Filed: Nov. 22, 1971
[21] Appl. No.: 201,130

[52] U.S. Cl................ 228/3, 29/203 D, 29/470.1, 29/484, 29/592, 74/54, 228/4
[51] Int. Cl............................................. B23k 21/00
[58] Field of Search .......................... 228/1, 3, 4, 6; 29/470.3, 470.1, 592, 484, 589, 203 D; 74/59

[56] References Cited
UNITED STATES PATENTS
| | | | |
|---|---|---|---|
| 3,045,715 | 7/1962 | Monahan et al.................... | 140/112 |
| 3,305,157 | 2/1967 | Pennings................................ | 228/1 |
| 3,342,395 | 9/1967 | Diepeneen.............................. | 228/1 |
| 3,543,988 | 12/1970 | Kulicke, Jr............................. | 228/3 |
| 3,678,768 | 7/1972 | Mansaur................................. | 74/54 |

Primary Examiner—J. Spencer Overholser
Assistant Examiner—Robert J. Craig
Attorney—Smyth, Roston & Pavitt

[57] ABSTRACT

A wire bonder comprising a supporting structure, a frame mounted on the supporting structure for pivotal movement about a first pivotal axis, a welder arm for performing a welding operation mounted on the frame for pivotal movement relative thereto about a second pivotal axis, a preprogrammed device for controlling the movement of the frame and the welder arm about the first and second pivotal axes, respectively, and an override device for overriding the predetermined program to alter the movement of the welder arm while permitting the predetermined program to remain as a memory.

7 Claims, 5 Drawing Figures

Patented Oct. 9, 1973

INVENTOR:
Jorgen F. Nielsen
By: Smyth, Roston & Pavitt
ATTORNEYS

Patented Oct. 9, 1973
3,764,055
2 Sheets-Sheet 2
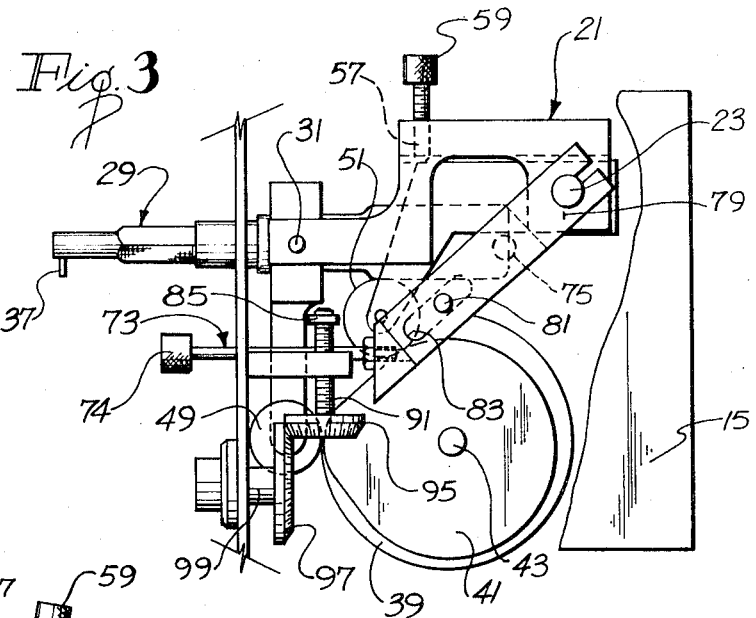
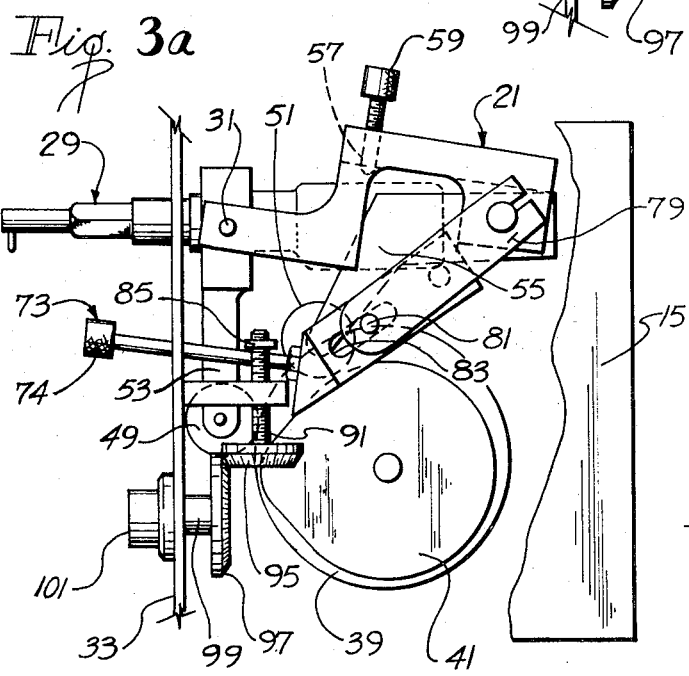
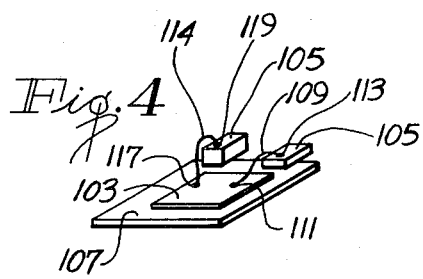
INVENTOR
Jorgen F. Nielsen
By: Smyth, Roston & Pavitt
ATTORNEYS 3,764,055

WIRE BONDER

BACKGROUND OF THE INVENTION

In the manufacture of circuit devices, it is often necessary to weld very fine diameter wire to separate circuit elements. The weld may be obtained by ultrasonic vibration of the wire or by the application of heat to the wire.

The wire is fed through an orifice in a member such as a bonding wedge carried by a welder arm. The welding machine moves the arm down to bond the wire to the first circuit element. Then the welding arm is elevated, the work piece is positioned, and the welder arm descends to form a second bond between the wire and the second circuit element. The wire is then severed to leave a loop of wire joining the two circuit elements.

The height of the loop is controlled by a number of factors including the relative heights of the two circuit elements with greater loop height being required for larger changes in elevation between the circuit elements. For a given welding operation there is often a need for many loops of standard height and a few loops of nonstandard height with the loops of nonstandard height being of greater height than the loops of standard height. A typical prior art welding machine of this type produces a loop of fixed height. When a loop of nonstandard height is to be made, permanent adjustments must be made such as the changing of cams and/or the adjustment of threaded adjustments. Similarly, to reset the welding machine from the nonstandard loop height back to the standard loop height, permanent mechanical adjustments or changes must again be made, e.g., cams must be changed or other time-consuming adjustments must be made. Thus, any adjustments to the welding machine resulting in a change in loop height are permanent in that the machine has no "memory" of the standard loop height, and to return the machine to making loops of standard height, relatively involved mechanical adjustments must be made. This increases the time required for production, increases labor cost and increases the ultimate cost of the circuit device being manufactured.

SUMMARY OF THE INVENTION

The present invention provides a wire bonder or welding machine having two independent modes of operation. In the first mode, the wire bonder produces loops of standard height. In the second mode, the wire bonder produces loops of nonstandard height. The second mode is provided as an override to the first mode of operation. A feature of the invention is that upon termination of the override mode, the wire bonder automatically returns to the first mode of operation and no cam changes, thread adjustments, or other mechanical alterations are necessary.

In the first mode of operation, the wire bonder is preprogrammed to produce loops of standard height. The program can be overridden, for example, manually overridden by actuating an operating member to thereby cause the machine to produce a loop of nonstandard height. To return the wire bonder to the program, it is only necessary to release the operating member. Thus, the program remains as a memory in the wire bonder and this saves substantial time.

With the present invention the height of the loop produced by the override can be adjusted. Accordingly, the nonstandard loop height can vary over a wide range.

These features can be advantageously embodied in a wire bonder which comprises a supporting structure, a frame, means for mounting the frame on the supporting structure for pivotal movement about a first pivotal axis, a welder arm for performing a welding operation, means for mounting the welder arm on the frame for pivotal movement relative thereto about a second pivotal axis, preprogrammed means for controlling the movement of the frame and the welder arm about the first and second pivotal axes, respectively, to thereby control the movement of the welder arm in accordance with the predetermined program, and override means for overriding the predetermined program to alter the movement of the welder arm without affecting the predetermined program.

The preprogrammed means can advantageously include one or more cams and cam followers for pivoting the frame and the welder arm. The override means includes an operating member which is capable of pivoting at least one of the frame and the welder arm about its respective pivotal axis to thereby remove the control of the welder arm from the cams and establish the new loop height. By releasing the operating member, the welder arm is returned to the control of the cam to thereby reestablish operation of the wire bonder in accordance with the predetermined program.

The height of the nonstandard loop is controlled by the positioning of an adjustable stop located in the path of movement of the operating member. The stop position can be changed by turning of a control knob. The control knob has indicia thereon correlating angular position of the control knob with stop position and loop height.

In changing the loop height, it is only necessary to move the welder arm a fractional portion of an inch. By way of example, a standard loop height may be of the order of 0.010 inch and a nonstandard loop height may be, for example, 0.100 inch. It is desirable to have the operating member movable through a distance which is relatively large in relation to the loop height. This is accomplished, at least in part, by pivotally mounting the operating member on the supporting structure and providing a lever which is connected to a shaft for pivoting of the frame. The lever and the operating member are drivingly connected at a location on the operating member intermediate the pivotal axis thereof and the end of the operating member which can be manually operated. When the operating member is pivoted through a given number of degrees, the lever is pivoted through a substantially lesser number of degrees to thereby effect movement reduction in that the input to this lever system is larger than the output.

The invention can best be understood by reference to the following description taken in connection with the accompanying illustrative drawings.

BRIEF DESCRIPTION OF THE DRAWINGS

FIG. 3 is a side elevational view taken generally along line 3—3 of FIG. 1 with the wire bonder being in a preprogrammed mode under the control of the cams. Part of the housing is broken away to show the interior of the wire bonder.

FIG. 3a is a side elevational view similar to FIG. 3 with the wire bonder being in a manual override mode.

FIG. 4 is a perspective view illustrating loops of different heights.

DESCRIPTION OF THE PREFERRED EMBODIMENT

Figure 1:
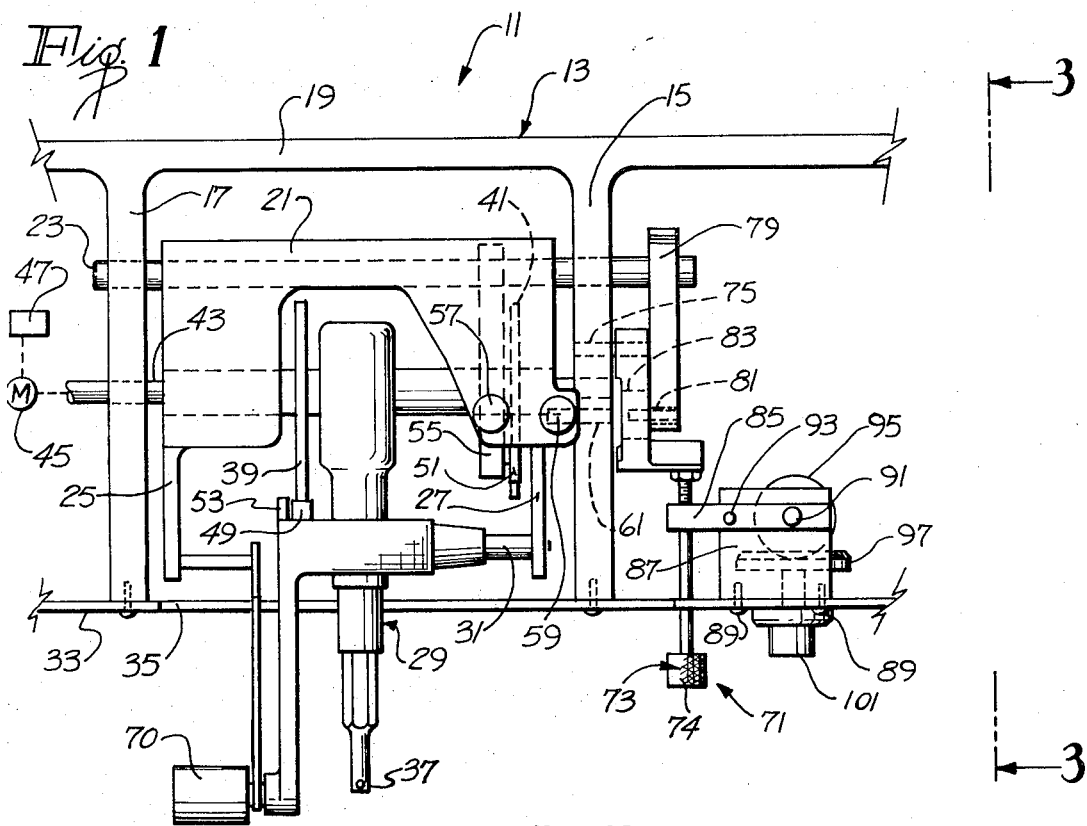
FIG. 1 is a fragmentary plan view of a wire bonder constructed in accordance with the teachings of the present invention.

FIG. 1 shows a welding machine or wire bonder 11 constructed in accordance with the teachings of this invention. The wire bonder 11 includes a supporting structure 13 which comprises a pair of spaced parallel flanges 15 and 17 interconnected by a web 19. A frame 21 is fixed to a shaft 23 which in turn is pivotally mounted on the flanges 15 and 17. The frame 21 has a pair of arms 25 and 27 to which a welder arm 29 is pivotally connected by a shaft 31. The shafts 23 and 31 define parallel horizontal pivotal axes for the frame 21 and the welder arm 29, respectively.

A front cover plate 33 is affixed to the flanges 15 and 17 in any suitable manner such as by screws. The cover plate 33 has an opening 35 therein through which the welder arm 29 projects.

In the embodiment illustrated, the welder arm 29 contains all of the necessary apparatus for forming an ultrasonic bond between metal parts. For example, the welder arm 29 includes a transducer and carries a bonding wedge 37 through which the wire to be bonded can be fed in accordance with known practice. Welder arms of this kind are well known and for this reason the welder arm 29 is not described more fully herein.

The welder arm 29 can be supported for movement in any suitable manner and the supporting apparatus illustrated is merely exemplary. Similarly, preprogrammed movement can be imparted to the welding arm 29 in any suitable manner. In the embodiment illustrated, such preprogrammed movement is derived from cams 39 and 41 which are mounted for rotation on a shaft 43. The shaft 43 is mounted for rotation on the flanges 15 and 17. The shaft 43 is rotated by a motor 45 which is controlled by a controller.

Cam followers 49 and 51 are mounted on arms 53 and 55, respectively. The cam followers 49 and 51 cooperate with the cams 39 and 41, respectively, to impart pivotal movement to the frame 21 and to the welder arm 29, respectively. The arm 53 is mounted on the welder arm 29 for movement therewith, and the arm 55 is mounted on the shaft 23 for pivotal movement about the shaft relative thereto. A screw 57 is received in the frame 21 and bears on the upper edge of the arm 55 (FIG. 2) so that upward movement of the arm 55 pivots the frame 21 upwardly about the shaft 23. By turning the screw 57, the orientation of the arm 55 and the frame 21 can be changed. Another screw 59 is received in the frame 21 and bears on a stop 61 to provide adjustable means for limiting the movement of the frame downwardly about the shaft 23. Thus, by rotation of the shaft 45 and consequent driving of the cams 39 and 41, the welder arm 29 can be caused to undergo preprogrammed movement as a result of pivoting of the frame 21 and the welder arm 29 about the shafts 23 and 31, respectively.

Typically, the wire is bonded to two circuit elements and after the completion of the second bond, the conductive wire must be cut. The wire cutting function can be carried out with any suitable apparatus. Similarly, can suitable wire feed mechanism can be incorporated into the welding machine 11. A weight 70 is joined to the arm 25 and to the welder arm 29 to provide the necessary force during the welding operation.

Figure 2:
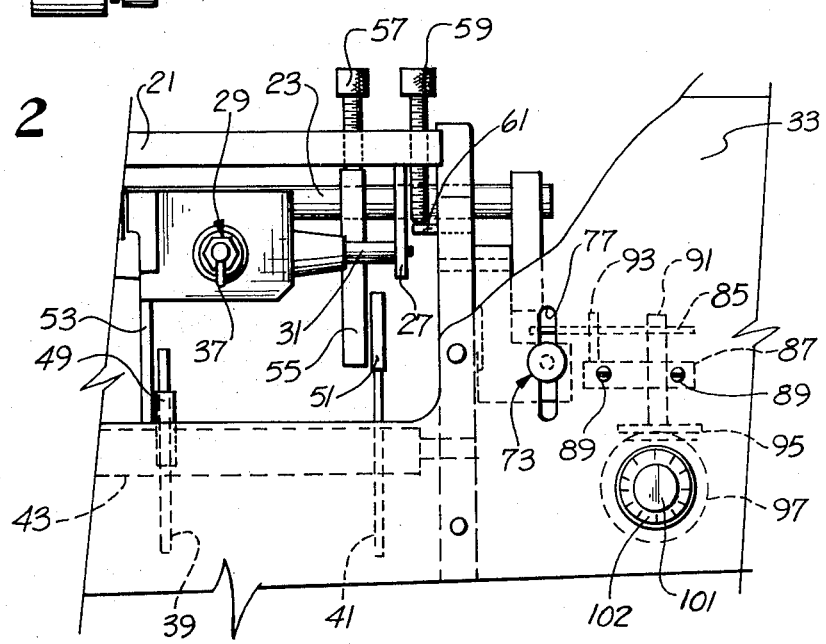
FIG. 2 is a fragmentary front elevational view of the wire bonder.

The present invention provides override means 71 for overriding the program established by the cams 39 and 41 without destroying that program. The override means 71 includes an operating member 73 which has a lifting end 74 and which is pivotally mounted at one end thereof by a pin 75 to the flange 15. As shown in FIG. 2, the operating lever 73 projects through a slot 77 in the cover plate 33. A lever 79 is connected to the shaft 23 for pivotal movement therewith, and a pin 81 carried by the lever 79 rides in a slot 83 (FIGS. 1, 3 and 3a). The pin 75 is horizontal, and accordingly, the operating member 73 is mounted for pivotal movement about a horizontal pivotal axis. The pin 75 lies intermediate the pin 81 and the pivotal axis of the lever 79, i.e., the shaft 23.

When the lifting end 74 of the operating member 73 is raised, the operating member pivots about the pin 75. This elevates the pin 81 with consequent elevation of the outer end of the lever 79. This imparts pivotal movement to the lever 79 with the result that the shaft 23 is pivoted to thereby provide an angular input motion to the welding machine. Because of the relationship between the operating member 73 and the lever 79, pivotal movement of the operating member 73 through a given number of degrees results in a pivotal movement of the lever 79 through a lesser number of degrees. This is the result of locating the pivotal axis of the operating member 73, i.e., the pin 75, intermediate the pin 81 and the pivotal axis of the lever 79, i.e., the shaft 23.

To control the amount of input motion to the welding machine in response to lifting of the lifting end 74, an adjustable stop 85 is provided. A mounting block 87 is mounted on the cover plate 33 in any suitable manner such as by screws 89. An externally threaded shaft 91 is suitably mounted by bearings (not shown) in the mounting block 87 for rotation relative thereto. The shaft 91 is held against translation relative to the mounting block 87. A pin 93 is rigidly affixed to the mounting block 87 and projects upwardly therefrom.

The adjustable stop 85 has a threaded aperture which receives the upper end of the externally threaded shaft 91 and is mounted thereon. The pin 93 is slidably received in an opening in the adjustable stop 85 so that the pin 93 can prevent rotation of the stop. Accordingly, rotational movement of the shaft 91 causes the external threads thereof to cooperate with the internal threads of the adjustable stop 85 to move the latter vertically.

A bevel gear 95 is mounted on the lower end of the shaft 91. A second bevel gear 97 is mounted for rotation with a stub shaft 99 which in turn is rotatably mounted on the cover plate 33. The stub shaft 99 and the bevel gear 97 can be rotated by a control knob 101 affixed to the shaft 99. Although the control knob may be of any suitable kind, in the embodiment illustrated, it is of the kind often employed with potentiometers. The control knob 101 and the area of the cover plate 33 immediately there-adjacent are provided with suitable indicia 102 to thereby correlate angular positions of the control knob 101 to vertical positions of the stop 85.

In operation of the wire bonder 11, the motor 45 (FIG. 1) drives the cams 39 and 41 to thereby cause the welder arm 29 to undergo preprogrammed pivotal movement. In the embodiment illustrated, a cam follower 49 cooperates with the cam 39 to move an arm 53 which is directly connected to the welder arm 29 thereby imparting pivotal movement to the welder arm about the shaft 31. The cam follower 51 cooperates with the cam 41 to impart preprogrammed movement to the arm 55. The arm 55 bears on a screw 57 attached to the frame 21 to thereby pivot the frame about the shaft 23. As the shaft 31 is carried by the frame 21, pivotal movement of the latter affects the positioning of the welder arm 29. The specific movement imparts to the welder arm 29 may be selected by those skilled in the art and the movement may, for example, be in accordance with U.S. Pat. No. 3,305,157.

FIG. 4 shows an example of the kind of wire bonding operation which may be carried out by the wire bonder 11. As shown in FIG. 4, circuit elements 103 and 105 are suitably affixed to a substrate 107. A conductive wire 109 is bonded to the circuit elements 103 and 105 by bonds 111 and 113, respectively. The wire 109 is in the form of a loop which rises above the upper surfaces of the conductive elements 103 and 105.

To form the bond 111, the cams 39 and 41 cause the welder arm to descend to form the bond 111 following which the arm is elevated by the cams, and the substrate is repositioned by an appropriate positioning table (not shown). Next the cams 39 and 41 cause the welder arm 29 to descend to form the bond 113 between the wire 109 and the circuit element 105. The amount that the welder arm 29 is elevated after making the bond 111 controls the height of the loop or height that the wire 109 rises above the substrate 107.

FIG. 4 also shows a second wire 114 which is connected to the circuit elements 103 and to a circuit element 115 by bonds 117 and 119, respectively. The wire 113 requires a higher loop because the circuit element 115 is thicker or higher than the circuit element 105. Accordingly, after forming the bond 117 between the wire 114 and the circuit element 103, the welder arm 29 must be elevated a greater distance than in moving between the bonds 111 and 113. To make this greater or nonstandard loop height, the override means 71 of the present invention is used in the manner described below.

When the welding machine 11 is under the control of the cams 39 and 41, the shaft 23 and the lever 79 are rotated by the cam 41 with the result that the operating member 73 is pivoted by the lever 79. Thus, the position of the operating member 73 as shown in FIG. 3 depends upon the angular position of the cam 41.

The height of the adjustable stop 85 can be selected by turning of the control knob 101. Rotation of the control knob 101 drives the bevel gears 97 and 95 and the externally threaded shaft 91. This raises or lowers the adjustable stop 85 an amount indicated by the indicia 102 (FIG. 2). With the height of the adjustable stop appropriately set and the motor 45 deenergized, the operator merely lifts upwardly on the lifting end 74 of the operating member 73 until the latter strikes the undersurface of the adjustable stop 85 as shown in FIG. 3a. This pivots the operating member 73 about the shaft 75. Because the pin 81 and the slot 83 form a driving connecting between the operating member 73 and the lever 79, pivotal movement of the operating member causes the lever 79 to pivot. Because the lever 79 is affixed to the shaft 23, the shaft 23 and the frame 21 pivot about the axis of the shaft 23. This raises the shaft 31 and affects the height of the welder arm 29. As shown in FIG. 3a, upward pivotal movement of the frame 21 lifts the frame and in particular the screw 57 off of the upper surface of the arm 55 with the result that the cam 41 no longer controls the position of the frame 21. The upward movement of the shaft 31 results in upward movement of the welder arm 29 affixed thereto and of the arm 53. Whether or not the welder arm 29 pivots about the shaft 31 as the shaft 31 is raised upwardly depends upon the contour of the cam 39. Preferably, the cam 39 presents a generally vertical contour to the follower 49 which will not result in significant pivotal movement of the welder arm 29 during manual override.

The increase in elevation of the welder arm 29 as the result of the manual override facilitates the formation of the relatively high loop formed by the wire 113 (FIG. 4) and the ultimate bond 119 to the circuit element 115. Following completion of the bond 119, the wire is severed in any suitable manner.

To return the welding machine to the control of the program, i.e., to the cams 39 and 41, the operator merely releases the operating member 73 to allow the frame 21 to return to the position shown in FIGS. 1–3 in which the screw 57 rests on the upper surface of the arm 55. Thus, operation of the manual override for selected loops does not destroy or alter the standard program which is usable for the majority of loops.

Although exemplary embodiment of the invention has been shown and described, many changes, modifications and substitutions may be made by one having ordinary skill in the art without necessarily departing from the spirit and scope of this invention.

I claim:

1. A wire bonder comprising:
a supporting structure;
a welder arm;
mounting means for mounting said welder arm on said supporting structure for pivotal movement relative thereto;
actuator means for controlling the pivotal movement of said welder arm relative to said supporting structure in accordance with a predetermined program;
an operating member;
means for mounting said operating member on said supporting structure for movement relative thereto along a predetermined path;
means for drivingly connecting said operating member and said welder arm so that movement of said operating member in a first direction along said path moves said welder arm to thereby remove control of the welder arm from said actuator means and said predetermined program without substantially changing the predetermined program;
a stop;
means for mounting said stop in said path to limit the length of movement of said operating member to thereby limit the movement of said welder arm by said operating member;
said last mentioned means mounting said stop at any one of a plurality of positions in said path whereby said stop is an adjustable stop and the operating member can vary the degree of movement of the welder arm from said predetermined program;

a control member pivotally mounted on said supporting structure; and means drivingly connecting said control member and said stop whereby pivotal movement of said control member adjusts the position of said stop, said control knob having indicia thereon indicating the position of said stop when the indicator means is in a given position.

2. A wire bonder as defined in claim 1 wherein said means for mounting said welder arm includes a shaft pivotally mounted on said supporting structure, said means for mounting said operating member including a portion of said shaft, said operating member being mounted on said portion of said shaft for pivotal movement therewith, said means for mounting said welder arm including means drivingly coupled to said shaft to impart movement to said welder arm in response to pivotal movement of said shaft relative to said supporting structure.

3. A wire bonder as defined in claim 1 wherein said operating member is pivotally mounted on the supporting structure, said means for drivingly connecting including a lever, means for pivotally mounting the lever on the supporting structure and means for drivingly connecting said lever and said welder arm, said operating member being drivingly connected to said lever.

4. A bonding machine comprising:
a supporting structure;
a frame;
means for mounting said frame on said supporting structure for pivotal movement about a first pivotal axis;
a welder arm for performing a welding operation;
means for mounting said welder arm on said frame for pivotal movement relative thereto about a second pivotal axis;
preprogrammed means for controlling the pivotal movement of said frame and said welder arm about said first and second pivotal axes, respectively, to thereby control the movement of said welder arm in accordance with a predetermined program; and
override means for overriding the predetermined program to alter the pivotal movement about at least one of said pivotal axes to thereby alter the movement of the welder arm and for automatically returning said welding arm to the control of said preprogrammed means for control of the welding arm in accordance with said predetermined program whereby said predetermined program is substantially uneffected by the operation of said override means.

5. A bonding machine as defined in claim 4 wherein said override means is adjustable so that the degree of alteration of movement of the welder arm by the override means can be changed.

6. A bonding machine as defined in claim 4 wherein said pivotal axes are generally parallel and generally horizontal, said preprogrammed means including a plurality of cams for controlling the movement of the welder arm, said override means including a movable operating member.

7. A bonding machine comprising:
a supporting structure;
a frame;
means for mounting said frame on said supporting structure for pivotal movement about a first pivotal axis;
a welder arm for performing a welding operation;
means for mounting said welder arm on said frame for pivotal movement relative thereto about a second pivotal axis;
preprogrammed means for controlling the movement of said frame and said welder arm about said first and second pivotal axes, respectively, to thereby control the movement of said welder arm in accordance with a predetermined program;
an operating member;
means for mounting said operating member on said supporting structure for pivotal movement relative thereto;
means for drivingly connecting said operating member and said welder arm whereby said welder arm can be moved by manual movement of said operating member;
a stop fixed in the path of movement of said operating member for limiting the length of movement of said operating member in one direction along said path; and
means for mounting said stop on said supporting structure for movement relative thereto whereby the stop can be located at various fixed positions along said path to thereby limit the manual movement which can be imparted to the welder arm by said operating member.

\* \* \* \* \*